United States Patent [19]
Hirata et al.

[11] Patent Number: 5,508,345
[45] Date of Patent: Apr. 16, 1996

[54] RESIN COMPOSITION FOR HARNESS PART

[75] Inventors: Noboru Hirata; Yasushi Kameyama; Hiroyuki Katayama, all of Hiroshima; Masahiro Fukunaga; Okihiro Morimoto, both of Yamaguchi, all of Japan

[73] Assignees: Yazaki Corporation, Tokyo; Ube Industries, Ltd., Yamaguchi, both of Japan

[21] Appl. No.: 293,022

[22] Filed: Aug. 19, 1994

[30]     Foreign Application Priority Data

Aug. 20, 1993  [JP]  Japan ................... 5-206479

[51] Int. Cl.$^6$ ................... C08L 77/02; C08L 77/06; C08F 255/02
[52] U.S. Cl. ................... 525/66
[58] Field of Search ................... 525/66

[56]           References Cited

U.S. PATENT DOCUMENTS

| | | | |
|---|---|---|---|
| 4,404,312 | 9/1983 | Kokubu et al. | 525/66 |
| 4,461,808 | 7/1984 | Mollison | 525/432 |
| 4,537,929 | 8/1985 | Nargrani | 525/66 |
| 4,988,264 | 1/1991 | Nishio et al. | 525/66 |
| 5,159,018 | 10/1992 | Nishio et al. | 525/397 |
| 5,256,719 | 10/1993 | Sham et al. | 525/66 |
| 5,310,821 | 5/1994 | Kodaira et al. | 525/397 |

FOREIGN PATENT DOCUMENTS

| | | |
|---|---|---|
| 2543149 | 9/1984 | France . |
| 4331248 | 11/1992 | Japan . |

*Primary Examiner*—Thomas Hamilton, III
*Attorney, Agent, or Firm*—Sughrue, Mion, Zinn, Macpeak & Seas

[57]           ABSTRACT

A resin composition for a harness part, which composition comprises (A) from 50 to 70% by weight polyamide composition comprising (A1) an unmodified polyamide 66 and (A2) a modified polyamide 6 having a terminal amino group content of $7\times10^{-5}$ to $12\times10^{-5}$ eq/g, with the weight ratio of the unmodified polyamide 66 (A1) to the modified polyamide 6(A2) being from 80/20 to 50/50 by weight, and (B) from 30 to 50% by weight polypropylene graft-polymerized with 0.3 to 0.6% by weight of maleic anhydride.

5 Claims, 1 Drawing Sheet

RESIN COMPOSITION FOR HARNESS PART

FIELD OF THE INVENTION

The present invention relates to a resin composition for a harness part for motor vehicles. More particularly, it relates to a resin composition suitable for use in producing a harness part excellent in resistance to calcium chloride, heat resistance and moldability, e.g., a part such as a protector, clamp, and tying band, which serves to tie electrical wires together mainly in an engine room to protect them and fix the tied electrical wires to the body of motor vehicles.

BACKGROUND OF THE INVENTION

Harness parts for motor vehicles have conventionally been produced from a synthetic resin such as polyamide 6, polyamide 66, or polypropylene from the standpoints of strength, heat resistance, etc. However, harness parts made of such polyamide resins have been unsatisfactory in that thin-wall regions thereof (e.g., 0.2 to 0.5 mm) come into the absolute dry state due to the heat of the engine to have impaired toughness and that they have insufficient resistance to calcium chloride. Further, harness parts made of polypropylene have not always been satisfactory in log-term heat resistance and rigidity, although relatively satisfactory in toughness and calcium chloride resistance.

Since all the requirements of a harness part, i.e., toughness, heat resistance, and calcium chloride resistance, have thus been unable to be simultaneously met with any single material, harness parts made of different materials have been suitably used according to places of use.

With the recent improvement in the performances of motor vehicles, the number of parts employed in an engine room has increased and the resin moldings used therein have come to be exposed to atmospheres of higher temperatures than conventional ones. Hence, higher performances have come to be required of harness parts. If there is a synthetic molding resin which combines the properties of a polyamide and those of polypropylene, it is thought that these various performance requirements of a harness part can be met in a wider range.

It is however known that merely blending a polyamide resin with polypropylene only gives resin compositions which are not significantly improved in toughness and calcium chloride resistance. The reason for this is that since polyamide resins are inherently incompatible with polypropylene, intimate mixtures of the resins are not obtained. Several techniques have therefore been proposed so far for intimately blending a polyamide resin with polypropylene.

Proposed as expedients for improving the compatibility of a polyamide resin with polypropylene are a technique of incorporating an ionomer (as described in JP-B-43-6529), and a technique of using a modified polyolefin (as described in JP-B-45-30945). (The term "JP-B" as used herein means an "examined Japanese patent publication.") However, these techniques have failed to sufficiently improve calcium chloride resistance, although effective in improving compatibility.

A technique of chemically bonding the two resins by modifying each resin at terminals thereof has been proposed (as described in JP-B-64-56751). In this technique, a polyamide resin modified at terminal amino groups is melt-kneaded with a polypropylene modified with an unsaturated carboxylic acid using a single-or twin-screw extruder. However, there is a problem that since terminal groups of either resin react with terminal groups of the other during kneading to increase the melt viscosity, the composition has impaired moldability and molding of thin-wall products is adversely affected because unevenness of wall thickness is apt to result.

SUMMARY OF THE INVENTION

In view of the fact that a resin composition having sufficient calcium chloride resistance and sufficient mechanical strength including impact resistance is not obtained by any prior art technique, the present inventors made intensive studies in order to obtain a harness part excellent in heat resistance and toughness as well as calcium chloride resistance. As a result, it has been found that a harness part molded from a resin composition comprising a terminal-modified polyamide, an unmodified polyamide, and a terminal-modified polypropylene in a specific proportion satisfies those requirements. The present invention has thus been attained.

Accordingly, an object of the present invention is to provide a novel resin composition for molding from which a harness part excellent in calcium chloride resistance, heat resistance, and toughness can be produced.

Other objects and effects of the present invention will be apparent from the following description.

The present invention-relates to a resins-composition for a harness part, which composition comprises (A) from 50 to 70% by weight polyamide composition comprising (A1) an unmodified polyamide 66 and (A2) a modified polyamide 6 having a terminal amino group content of $7 \times 10^{-5}$ to $12 \times 10^{-5}$ eq/g, with the weight ratio of the unmodified polyamide 66 (A1) to the modified polyamide 6 (A2) (A1/A2) being from 80/20 to 50/50, and (B) from 30 to 50% by weight polypropylene which is graft-polymerized with 0.3 to 0.6% by weight of maleic anhydride (hereafter, referred to as "modified polypropylene").

DETAILED DESCRIPTION OF THE INVENTION

Figure 1:
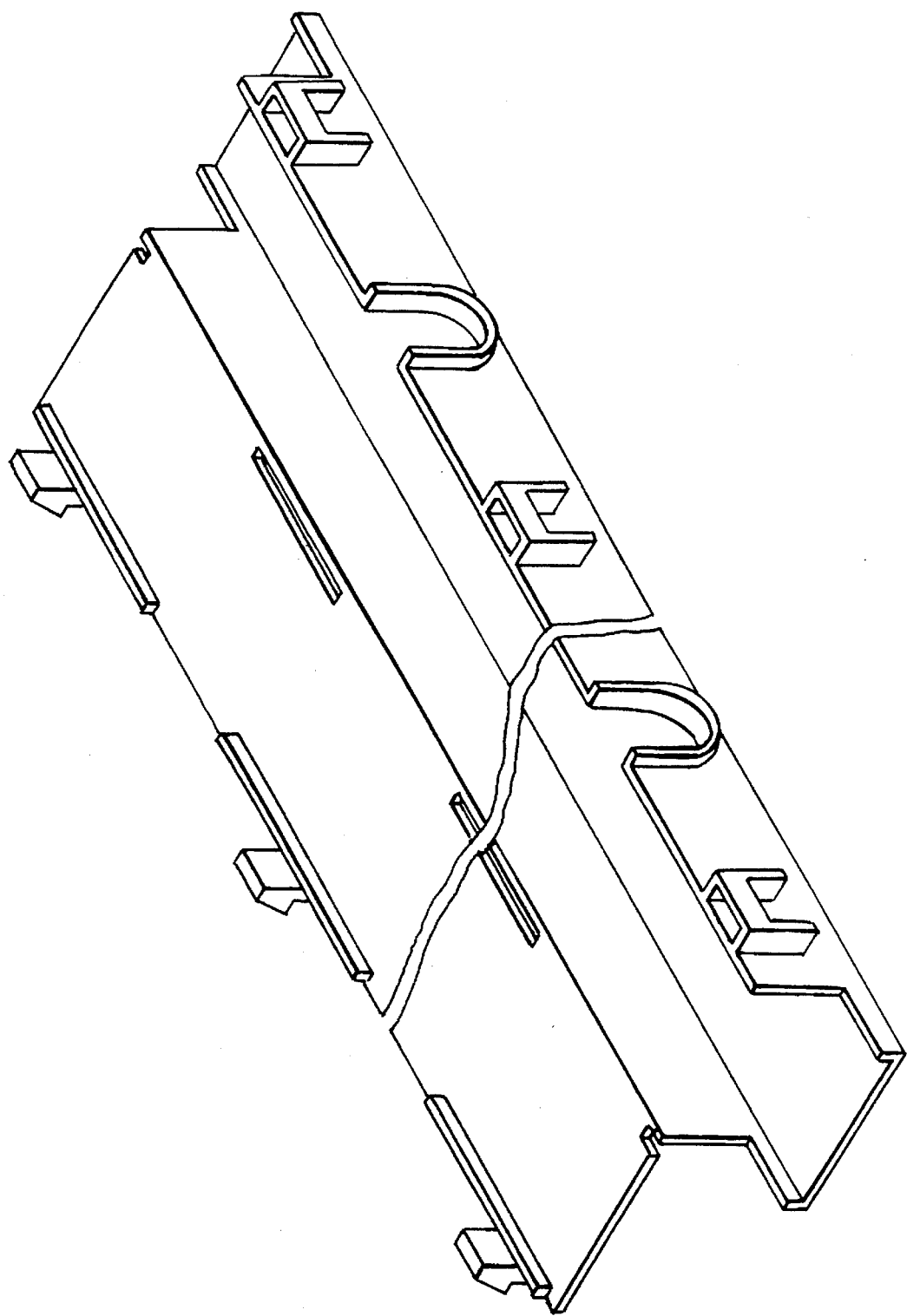
FIG. 1 is a slant view of a protector for a test harness which protector has been molded from a resin composition according to the present invention.

The modified polyamide 6 (A2), which has been modified so as to have a regulated terminal amino group content and is to be blended with the unmodified polyamide 66 (A1) to constitute the polyamide composition (A), should have a terminal amino group content in the range of from $7 \times 10^{-5}$ to $12 \times 10^{-5}$ eq/g, preferably from $8 \times 10^{-5}$ to $10 \times 10^{-5}$ eq/g. Terminal amino group contents thereof below $7 \times 10^{-5}$ eq/g are undesirable in that the polyamide composition (A) has insufficient compatibility with the modified polypropylene (B). If the terminal amino group content thereof is above $12 \times 10^{-5}$ eq/g, the composition will be fed to a molding machine before completion of the reaction with the modified polypropylene (B) and this results in troubles including a viscosity increase during molding, making it difficult to conduct stable molding. Further, the modified polyamide 6 (A2) is preferably prepared to have the terminal amino group content slightly excess to the equimolar amount of the terminal carboxyl group contained in the modified polyamide, whereby the compatibility with the modified polypropylene (B) is improved. The terminal carboxyl group content in the modified polyamide 6 (A2) is generally less then $5\times10^{-3}$ eq/g, preferably from $1\times10^{-3}$ to $3\times10^{-3}$ eq/g.

The weight ratio of the unmodified polyamide 66 (A1) to the modified polyamide 6 (A2) (A1/A2) is from 80/20 to 50/50. If the ratio of the unmodified polyamide 66 (A1) to the modified polyamide 6 (A2) is increased beyond 80/20, compatibility with the modified polypropylene (B) becomes poor and this results in impaired calcium chloride resistance. On the other hand, if the ratio is lower than 50/50, the composition will be fed to an injection molding machine before completion of the reaction between the modified polyamide 6 (A2) and the modified polypropylene (B) during kneading and this results in impaired stability in molding operation as in the above-described case.

In the resin composition of the present invention, the proportion of the unmodified polyamide 66 (A1) is preferably from 25 to 56% by weight, more preferably from 27 to 53% by weight, and that of the modified polyamide 6 (A2) is preferably from 14 to 25% by weight, more preferably from 17 to 23% by weight, both based on the total amount of the polyamide composition (A) and the modified polypropylene (B).

The unmodified polyamide 66 (A1) preferably has a relative viscosity $\eta_r$ of from 2.4 to 2.9 and a number average molecular weight of from 15,000 to 20,000. The modified polyamide 6 (A2) preferably has a relative viscosity $\eta_r$ of from 2.2 to 3.0 and a number average molecular weight of from 11,000 to 15,000.

The modified polypropylene (B) contained in the resin composition of the present invention is a polypropylene resin graft-polymerized with 0.3 to 0.6% by weight, preferably 0.35 to 0.55% by weight, of maleic anhydride. The modification with maleic anhydride can be accomplished by grafting maleic anhydride onto polypropylene by, e.g., kneading the polymer along with maleic anhydride with heating. If the amount of the maleic anhydride is below 0.3 wt % based on the amount of the polypropylene, sufficient compatibility with the polyamide composition (A) is not obtained, resulting in a composition having insufficient-impact strength. If maleic anhydride is used for modification in an amount larger than 0.6 wt % based on the polypropylene, impact strength reaches the maximum and is not improved any more, although compatibility with the polyamide composition (A) becomes better. The modified polypropylene (B) preferably has a melt flow rate of from 30 to 70 g/10min.

In the resin composition of the present invention, the proportion of the polyamide composition (A), which comprises unmodified polyamide 66 (A1) and the modified polyamide 6 (A2), should be from 50 to 70% by weight, preferably from 55 to 65% by weight, and that of the modified polypropylene (B) should be from 30 to 50% by weight, preferably from 35 to 45% by weight, both based on the total amount of the polyamide composition (A) and the modified polypropylene (B). If the amount of the modified polypropylene is below 30% by weight, the desired properties of the final product are unattainable with respect to calcium chloride resistance and toughness. Amounts thereof above 50% by weight are undesirable in that not only insufficient heat resistance but also impaired moldability results.

While the resin composition of the present invention for a harness part comprises the polyamide composition (A) of the combination of unmodified polyamide/modified polyamide and the modified polypropylene (B) as essential ingredients, it is possible to further incorporate appropriately selected optional ingredients other than-the essential ones as long as the optional ingredients do not adversely affect the performance of the final product to spoil the objects of the present invention. Examples of the optional ingredients include an inorganic filler, an antioxidant, an ultraviolet absorber, a weathering and light stabilizer, a release agent, a nucleating agent, a heat stabilizer, a plasticizer, a lubricant, an antistatic agent, a flame retardant, a pigment, and a dye.

Such a resin composition can be produced, for example, by mixing these ingredients and kneading the mixture using a conventionally known apparatus for compound manufacture, such as a single- or twin-screw extruder or a kneader.

In using the resin composition of the present invention to produce a harness part excellent in calcium chloride resistance and other properties, conventionally known molding techniques including injection molding, compression molding, and extrusion molding may be employed without any particular limitation.

Besides being used for producing harness parts such as a harness protector, harness clamp, and tying band, the resin composition of the present invention can be used for producing products of other kinds. Applications thereof are not particularly limited.

The present invention will be explained below in more detail by reference to examples, but the invention construed as being limited thereto.

EXAMPLE 1

Unmodified polyamide 66 having a relative viscosity $\eta_r$ of 2.5 ("2015B", manufactured by Ube Industries, Ltd., Japan) was blended with a modified polyamide 6 having a terminal amino group content of $9.8\times10^{-5}$ eq/g and a terminal carboxyl group content of $2.5\times10^{-5}$ eq/g and having a relative viscosity $\eta_r$ of 2.6 ("1015A", manufactured by Ube Industries, Ltd.) in a weight ratio of 2/1, to prepare a polyamide composition.

A modified polypropylene ("ZP648", manufactured by Ube Industries, Ltd.) was produced by graft modification of molten polypropylene with 0.4 wt % maleic anhydride at 230° C. It had a melt flow rate (according to ASTM D-1238) of 50 g/10min.

The polyamide composition and the modified polypropylene described above were mixed in a weight ratio of 60/40. To 100 parts by weight of the mixture, 0.003 part by weight of copper iodide, 0.05 part by weight of potassium iodide, and 0.002 part by weight of melamine were added as heat stabilizers. The resulting mixture was kneaded with a twin-screw extruder to obtain a resin composition according to the present invention.

The resulting resin composition was molded with an injection molding machine ("IS125CN", manufactured by Toshiba Corp., Japan) under the following-molding conditions to obtain a harness protector having the shape shown in FIG. 1.

Infection Molding Conditions:

| | |
|---|---|
| Cylinder temperature: | 290° C. |
| Mold temperature: | 80° C. |
| Injection pressure: | 700 kgf/cm$^2$ |
| Injection speed: | medium low |

EXAMPLE 2

A resin composition according to the present invention was obtained in the same manner as in Example 1 except that the weight ratio of the polyamide composition to the modified polypropylene was changed from 60/40 to 70/30.

The resulting resin composition was molded under the same molding conditions as in Example 1 to obtain a harness protector.

EXAMPLE 3

A resin composition according to the invention was obtained in the same manner as in Example 1 except that the weight ratio of the polyamide composition to the modified polypropylene was changed from 60/40 to 80/20.

The resulting resin composition was molded under the same molding conditions as in Example 1 to obtain a harness protector.

Comparative Example 1

The same procedures as in Example 1 were conducted except that polyamide 6 in which the terminals thereof were unmodified was used in place of the polyamide composition used in Example 1, to obtain a comparative resin composition.

The resulting resin composition was molded under the same molding conditions as in Example 1 to obtain a comparative harness protector.

Comparative Example 2

The same procedures as in Example 1 were conducted except that a polyamide composition obtained by blending an unmodified polyamide 66 having a relative viscosity $\eta_r$ of 2.5 ("2015B", manufactured by Ube Industries, Ltd.) with an unmodified polyamide 6 having a relative viscosity $\eta_r$ of 2.6 ("1015B", manufactured by Ube Industries, Ltd.) in a weight ratio of 2/1 was used in place of the polyamide blend used in Example 1. Thus, a comparative resin composition was obtained.

The resulting resin composition was molded under the same molding conditions as in Example 1 to obtain a comparative harness protector.

Each of the thus-obtained harness protectors was evaluated by the methods shown below, and their properties were compared.

Evaluation Items and Evaluation Methods:

(1) Calcium Chloride Resistance

Each harness protector to be tested was lidded, and the action of saturated aqueous calcium choride solution on the folding hinge part was examined through the following

| Step 1: | standing under conditions of 40° C. and 95% RH for 8 hours |
| Step 2: | spraying with saturated aqueous calcium chloride solution |
| Step 3: | standing in a 80° C. drying oven for 6 hours |
| Step 4: | standing under conditions of 23° C. and 65% RH for 6 hours |
| Step 5: | standing in a −30° C. freezer for 4 hours |
| Step 6: | standing under conditions of 23° C. and 65% RH for 6 hours |

These steps were conducted successively in that order and this procedure was repeated. The hinge part was examined for cracks after each cycle, and the calcium resistance was evaluated in terms of the number of cycle repetition required for the hinge part to develop cracks.

(2) Toughness

Tensile elongation (%) was measured in accordance with ASTM D-638.

(3) Deflection Temperature Under Load

Deflection temperature under load (°C.) was measured in accordance with ASTM D-648 under a load of 4.6 kgf/cm$^2$.

(4) Long-Term Heat Resistance

Test pieces for tensile test were placed in a 120° C. Geer oven and the time period (hr) required for the tensile strength of the test pieces as measured in accordance with ASTM D-638 to decrease to half the initial value was determined to evaluate the long-term high-temperature resistance.

Table 1 shows the formulations of the resin compositions of the Examples and Comparative Examples, while Table 2 summarizes the test results obtained for the harness protectors molded from these resin compositions. The results show that use of the resin compositions of the present invention enables the production of harness parts with excellent properties.

TABLE 1

| | Formulation of Resin Composition (%) | | | |
| --- | --- | --- | --- | --- |
| | Polyamide 66 | Polyamide 6 | Polypropylene | Heat stabilizer |
| Example 1 | 2015B (40) | 1015A (20) | ZP648 (40) | added |
| Example 2 | 2015B (46.7) | 1015A (23.3) | ZP648 (30) | added |
| Example 3 | 2015B (53.3) | 1015A (26.7) | ZP648 (20) | added |
| Comparative Example 1 | — | 1015B (60) | ZP648 (40) | added |
| Comparative Example 2 | 2015B (40) | 1015B (20) | ZP648 (40) | added |

Note:
2015B: unmodified polyamide 66
1015A: modified polyamide 6
1015B: unmodified polyamide 6
ZP648: modified polypropylene

TABLE 2

| | Calcium chloride resistance | Toughness (elongation) (%) | Deflection temperature under load (°C.) | Long-term heat resistance (hr) |
| --- | --- | --- | --- | --- |
| Example 1 | ≧15 | 170 | 150 | 13,000 |
| Example 2 | 10 | 150 | 160 | 13,000 |
| Example 3 | 8 | 130 | 182 | 15,000 |
| Comparative Example 1 | 8 | 160 | 135 | 9,000 |
| Comparative Example 2 | 10 | 150 | 144 | 10,000 |

The resin composition of the present invention for harness parts has good moldability and harness parts excellent in calcium chloride resistance, toughness, heat resistance, and deflection temperature under load can be efficiently produced therefrom.

While the invention has been described in detail and with reference to specific embodiments thereof, it will be apparent to one skilled in the art that various changes and modifications can be made therein without departing from the spirit and scope thereof.

What is claimed is:

1. A resin composition for a harness part, which composition comprises (A) from 50 to 70% by weight polyamide composition comprising (A1) an unmodified polyamide 66 and (A2) a modified polyamide 6 having a terminal amino group content of $7 \times 10^{-5}$ to $12 \times 10^{-5}$ eq/g, with the weight ratio of said unmodified polyamide 66 (A1) to said modified polyamide 6 (A2) being from 80/20 to 50/50, and (B) from 30 to 50% by weight modified polypropylene, wherein said modified polypropylene is polypropylene with graft-polymerized 0.3 to 0.6% by weight of maleic anhydride, wherein the 50 to 70% by weight range and the 30 to 50% weight range are based on the total amount of polyamide composition and modified polypropylene, and wherein the 0.3 to 0.6% by weight range is based on the amount of polypropylene.

2. A resin composition for a harness part as claimed in claim 1, wherein said resin composition comprises from 65 to 55% by weight of said polyamide composition (A) and from 35 to 45% by weight of said modified polypropylene (B), wherein the 65 to 55% by weight range and the 35 to 45% by weight range are based on the total amount of polyamide composition and modified polypropylene.

3. A resin composition for a harness part as claimed in claim 1, wherein said modified polyamide 6 (A2) has a terminal carboxyl group content of less than $5 \times 10^{-5}$ eq/g.

4. A resin composition for a harness part as claimed in claim 1, wherein said modified polyamide 6 (A2) has a terminal amino group content of from $8 \times 10^{-5}$ to $10 \times 10^{-5}$ eq/g and a terminal carboxyl group content of from $1 \times 10^{-5}$ to $3 \times 10^{-5}$ eq/g.

5. A resin composition for a harness part as claimed in claim 1, wherein said modified polypropylene (B) has a melt flow rate at 230° C. of from 30 to 70 g/10 min.

* * * * *